US006711405B2

United States Patent
Östrup et al.

(10) Patent No.: US 6,711,405 B2
(45) Date of Patent: Mar. 23, 2004

(54) COMMUNICATION SYSTEM

(75) Inventors: Nils Peter Östrup, Dublin (IE); Per Johan Schultz, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 520 days.

(21) Appl. No.: 09/835,479

(22) Filed: Apr. 16, 2001

(65) Prior Publication Data

US 2001/0055967 A1 Dec. 27, 2001

(30) Foreign Application Priority Data

Apr. 17, 2000 (GB) ............................................. 0009466

(51) Int. Cl.[7] ................................................. H04Q 7/20
(52) U.S. Cl. ..................................... 455/424; 455/67.11
(58) Field of Search ................................ 455/423, 424, 455/434, 515, 67.11, 9

(56) References Cited

U.S. PATENT DOCUMENTS

| 5,095,530 A | | 3/1992 | Tanaka et al. ................. 455/33 |
| 5,257,399 A | * | 10/1993 | Kallin et al. ................. 455/434 |
| 5,625,866 A | | 4/1997 | Lidbrink et al. ............... 455/8 |
| 5,956,648 A | | 9/1999 | Brennan et al. .............. 455/18 |
| 6,459,695 B1 | * | 10/2002 | Schmitt ....................... 370/344 |
| 6,535,736 B1 | * | 3/2003 | Balogh et al. .............. 455/434 |

FOREIGN PATENT DOCUMENTS

| EP | 0630 125 A2 | 12/1994 |
| GB | 2 268 366 A | 1/1994 |
| WO | WO 96/31988 | 10/1996 |
| WO | WO99/49688 | 9/1999 |

OTHER PUBLICATIONS

UK Patent Search Report by Examiner Robert Shorthouse dated Oct. 17, 2000 pertaining to Application No. GB0009466.4.
International Search Report (International Novelty Search).

* cited by examiner

Primary Examiner—Nguyen T. Vo
Assistant Examiner—Minh D. Dao

(57) ABSTRACT

There is described a method of detecting faults on an uplink control channel, such as an access channel. More specifically, a base station, or other network infrastructure component with a receiver for access requests, is provided with a separate receiver, which is adapted to detect and count access messages. The counted number of access messages is then compared with the number of access messages received by the first receiver. If the number of accesses received by the two receivers are significantly different, this may indicate a fault in the access channel.

20 Claims, 2 Drawing Sheets

COMMUNICATION SYSTEM

TECHNICAL FIELD OF THE INVENTION

The invention relates to a communication system, and more specifically relates to a method of monitoring the performance of an uplink control channel in a radiocommunications system.

BACKGROUND OF THE INVENTION

As is well known, there are many types of mobile radiocommunications systems, with the GSM system being just one example. Such systems define channels, over which mobile stations can communicate with a network infrastructure. In GSM, and other cellular radio systems, mobile stations communicate with base stations. Again, in GSM, and other cellular radio systems, the available channels are divided into traffic channels and one or more control channels. A control channel is used for various control functions, while the traffic channels are used to carry the actual communications between the mobile stations and base stations.

In particular, mobile communication systems typically define an access channel, which mobile stations use to communicate with a base station in order to indicate that they wish to access the network. The access channel may be a random access channel (RACH), meaning that any mobile station can send an access request message at any time, as long as it believes that no other mobile station is sending such a message.

Thus, in order for the system to operate satisfactorily, with mobile station users being able to access the network as required, it is important that the access channel, amongst other things, works as intended.

WO96/31988 discloses a cellular communications network, in which the system generates reports on the available signal quality in a cell, and also examines statistics on the traffic in a cell.

These statistics can be used to try and identify undetected faults in a random access channel. For example, the system can indicate if traffic levels are lower than expected, which may indicate that mobile stations are not able to access the system normally, but may simply be a natural fluctuation. More detailed analysis may reveal that handovers into a cell are still occurring, but that no calls are being set up in the cell.

This may well indicate a malfunction in the uplink control channel or access channel, but the necessary statistical analysis will inevitably mean that the fault will only be detected after some considerable time.

Moreover, a statistic such as this might also arise from a different malfunction.

SUMMARY OF THE INVENTION

The present invention is concerned with a method of detecting faults on an uplink control channel, such as an access channel.

More specifically, a base station, or other network infrastructure component with a receiver for access requests, is provided with a separate receiver, which is adapted to detect and count access messages. The counted number of access messages is then compared with the number of access messages received by the first receiver. If the number of accesses received by the two receivers are significantly different, this may indicate a fault in the access channel.

This has the advantage that it allows the network operator to obtain information quickly about potential faults in the network.

DETAILED DESCRIPTION OF PREFERRED EMBODIMENTS

The invention is described herein partly with reference to the Pacific Digital Cellular (PDC) standard, the air interface of which is specified in RCR STD-27. Thus, the term "access request" is used to denote the initial uplink access message. However, the invention is applicable to any digital mobile telephone system, for example based on the PDC standard, the GSM system, or the IS-136 standard (D-AMPS). Thus, in particular, any access message can be counted, depending on the system in use, and the terms "access message" and "access request" are to be interpreted broadly, to mean any uplink message sent during establishment of a connection.

As is well known, a cellular radiocommunications network includes a large number of cells. Each cell is served by a base station, and each mobile station within a cell communicates with that base station. As is well known, a single base station may be located between several (for example, three) cells, and may serve all of those cells.

Figure 1:
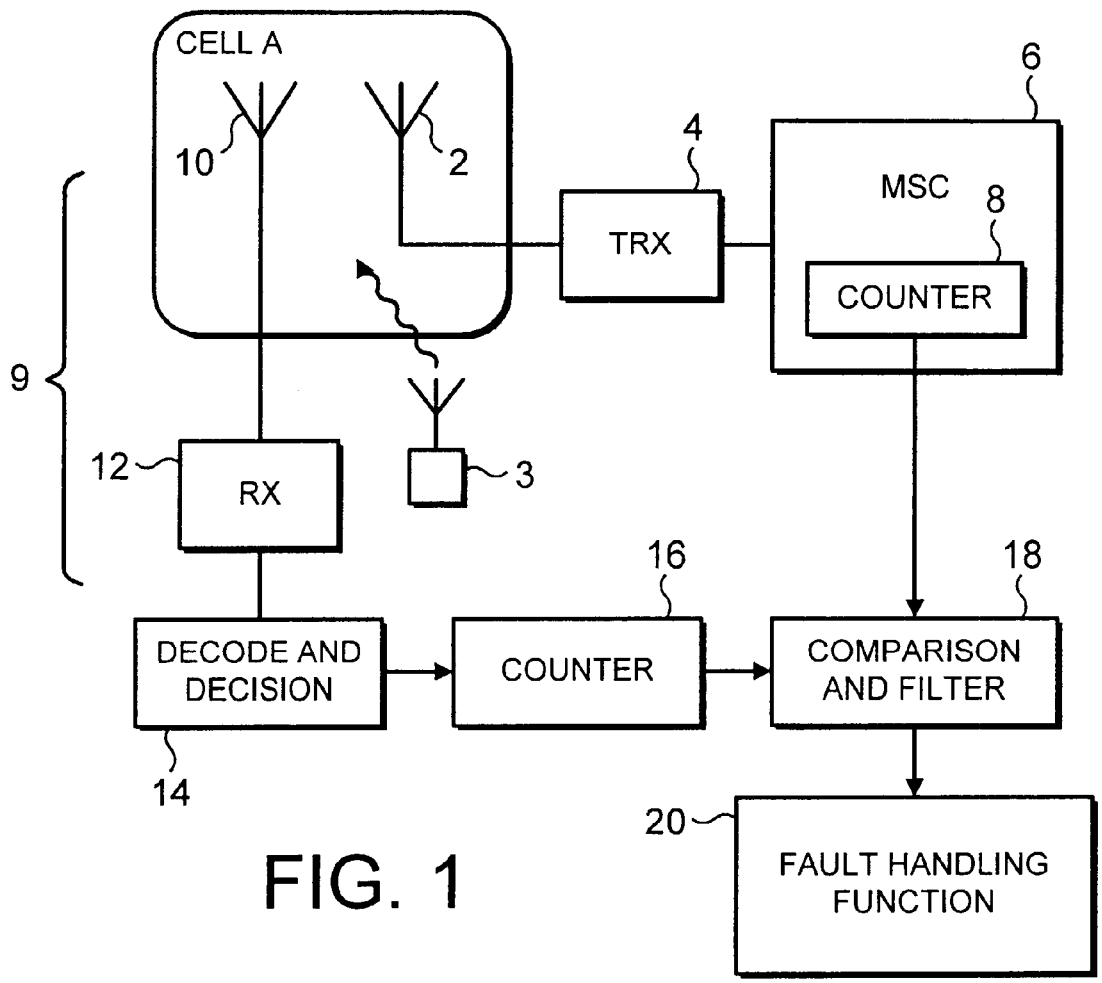
FIG. 1 is a block schematic diagram of a part of a radio communications network in accordance with the invention.

FIG. 1 shows schematically a small part of such a network. A base station in a cell, Cell A, includes an antenna 2, for receiving radio frequency transmissions from mobile stations 3 in the cell. Received signals are passed to a transceiver 4, which demodulates the received signals, and decodes the messages contained therein.

The base station is controlled by a mobile switching center (MSC) 6, which is responsible for determining, for example, whether access requests can be granted, and for allocating traffic channels to specific mobile stations. In accordance with one preferred embodiment of the invention, the MSC 6 includes a counter 8, for counting the number of received valid access requests, each of which should have led to a call setup.

Further in accordance with the preferred embodiment of the invention, the network infrastructure includes a parallel, standalone receiver 9 for receiving signals, including an antenna 10, and receiver circuits 12. The parallel receiver further includes decoding and decision making devices 14, and a second counter 16.

Outputs from the two counters 8, 16 are supplied to a comparison and filtering block 18, which provides an input to a fault finding function of the network.

Although FIG. 1 shows the logical separation of the parallel, standalone receiver 9, this may be provided physically at any point in the network. For example, the decoding and decision making block 14 and the counter 16 can conveniently be implemented in the MSC 6.

Further, the parallel receiver 9 is shown as completely separated from the normal receiver circuitry, which is advantageous from the point of view of fault detection. However, it may be preferable for the parallel receiver to share the antenna 2, or other components, of the normal receiver. Thus, it will be appreciated that many configurations of the components are possible.

Figure 2:
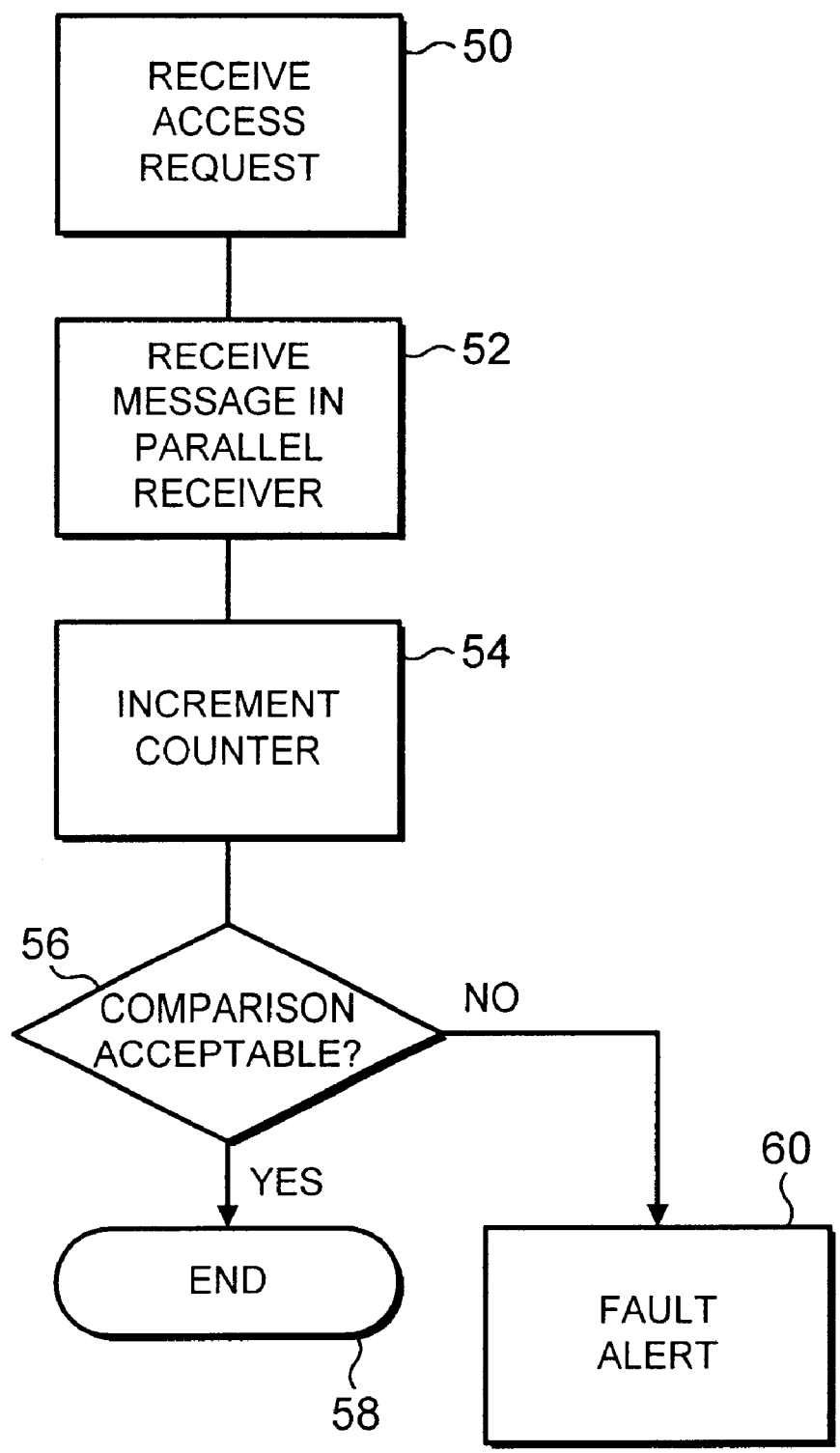
FIG. 2 is a flow chart illustrating the operation of a method in accordance with the invention.

FIG. 2 is a flow chart illustrating the method in accordance with the invention. Thus, in operation of the network, access requests are transmitted from mobile stations 3 to the base station, for example on a random access channel, and are received at the base station in the conventional way in step 50 of the method. Thus, the received signal is demodulated and decoded, and access messages which are successfully received at the MSC 6 are used to set up calls. The number of such successful access requests is counted, and the result sent to the comparison block 18.

At the same time, the parallel receiver 9 also receives the transmitted signals, in step 52, and decodes and checks incoming messages. The decoding block 14 is programmed with details of the messages which are possible access messages, and in one embodiment of the invention needs only to react to those messages. If a successfully received message is an access message, the counter 16 is incremented in step 54.

In step 56, the comparison block 18 then compares the number of successful accesses counted by the conventional receiver with the number of successfully received access messages counted by the parallel receiver 9.

If the numbers are within an acceptable margin of each other, it can be assumed that the access channel is operating acceptably, and the process can end at step 58.

For example, the numbers counted by the counter 8 associated with the conventional receiver, and by the counter 16 associated with the parallel receiver 9, during successive intervals can be compared. If the numbers differ by more than a predetermined percentage, for more than a predetermined number of successive intervals, then a fault can be suspected. However, other ways of comparing the count values can of course be used.

If the number of accesses received through the normal channel is significantly less than the number of successfully received access requests counted by the counter 16, then this is reason to suspect a fault on the normal channel, and a fault alert can be generated in step 60, and transmitted to a system fault handling function 20, which can lead to an attempt to diagnose a fault, either manually or automatically. Incidentally, if the number of accesses received through the normal channel is significantly more than the number of successfully received access requests counted by the counter 16, then there may be a fault in the parallel receiver.

In an alternative embodiment of the invention, the parallel receiver also decodes a second set of air interface messages. For example, in the PDC system, a mobile station sends an initial Location Registration Request, which is the access request or initial access message described so far. If the network accepts the request, it returns an Authentication Request. The mobile station responds with an Authentication Response, in reply to which the network sends a Location Registration Ack or Location Registration Reject message.

In this alternative embodiment, the number of second uplink messages (the Authentication Response messages) can be compared with the number of initial uplink messages. If there are more of the second uplink messages, or conversely if there are very many more of the first uplink messages, this can be indicative of a fault.

It will be appreciated that the invention described in general terms above can be implemented in many different ways.

For example, a cell may use several different control channels. In that case, a single parallel receiver may nevertheless be used to monitor the performance of all of these control channels. This can be achieved by tuning the parallel receiver to each of the control channels in turn. The proportion of the overall monitoring time which is spent tuned to each control channel can then be input to the comparison and filter block 18. For example, the parallel receiver may be tuned to each of the control channels for equal lengths of time.

The counter 8 can then monitor the number of accesses on each of the control channels, and these values can also be input to the comparison and filter block 18. A comparison can then be made between the counted number of accesses on each control channel in turn, scaled by the proportion of the overall monitoring time which the parallel receiver spends tuned to that control channel, and the number of access requests which the parallel receiver counts when it is tuned to that control channel.

In a similar way, a single parallel receiver may be provided at a base station which serves three or more cells. In that case, a single parallel receiver, having an omnidirectional antenna, may be used to monitor the performance of the control channels of all of the cells. This can be achieved by tuning the parallel receiver to each of the control channels in turn. Of course, this may not be entirely possible if the frequency re-use pattern means that the same control channel is used in more than one of the cells served by a base station.

Systems are known in which a base station is provided with equipment for performing verifications. In such systems, a base station includes a separate receiver. The separate receiver uses the base station antenna system, but has separate hardware. When the network determines that a handover may be necessary, and selects a target channel in a neighbouring cell, a verification request is sent to the verification channel in the target cell. That verification channel then performs signal strength measurements for a certain number of time slots on a specific frequency (or hopping sequence, if frequency hopping is used). Only if the verification channel determines that the signal strength reaches a desired value is the handover completed.

As is known, this hardware is therefore used for performing verifications for only a relatively small proportion of the total time for which the base station is in use. Thus, in accordance with the present invention, the hardware which is used for performing verifications for a part of the time can advantageously be used as the parallel receiver for monitoring the number of access requests on an uplink control channel, during the remainder of the time.

There are thus disclosed a method, and a network architecture, which allow the early detection of faults on a control channel.

What is claimed is:

1. A method of monitoring a control channel in a radio communications network comprising:
    a base station;
    a plurality of mobile stations; and
    first means for detecting access messages sent from mobile stations to the network;
    the method comprising:
       counting a first number of detected access messages;
       separately detecting access messages sent from said mobile stations by means of a receiver which is at least partly separate from the first means for detecting access messages;
       counting a second number of separately detected access messages; and
       comparing the first and second counted numbers.

2. A method as claimed in claim 1, comprising:
detecting a fault if a comparison result does not meet predetermined criteria.

3. A method as claimed in claim 1, comprising:
counting the first number during a plurality of time periods;
counting the second number during the same plurality of time periods; and
detecting a fault if the first and second numbers differ by more than a predetermined amount during more than a predetermined number of said time periods.

4. A method as claimed in claim 1, comprising:
using the at least partly separate receiver to detect access messages on a plurality of channels including a first access channel;
counting a first number of detected access messages on the first access channel;
counting the second number of separately detected access messages; and
comparing the first and second counted numbers, taking into consideration a proportion of the total monitoring time which the at least partly separate receiver spends monitoring the first access channel.

5. A method as claimed in claim 1, wherein the at least partly separate receiver is usable for performing verifications.

6. Apparatus for use in a radio communications network comprising:
a base station;
a plurality of mobile stations; and
first means for detecting access messages sent from mobile stations to the network;
the apparatus comprising:
means for counting a first number of detected access messages;
a receiver, which is at least partly separate from the first means for detecting access messages, for separately detecting access messages sent from said mobile stations;
means for counting a second number of separately detected access messages; and
means for comparing the first and second counted numbers.

7. Apparatus as claimed in claim 6, comprising:
means for detecting a fault if a comparison result does not meet predetermined criteria.

8. Apparatus as claimed in claim 6, comprising:
means for counting the first number during a plurality of time periods;
means for counting the second number during the same plurality of time periods; and
means for detecting a fault if the first and second numbers differ by more than a predetermined amount during more than a predetermined number of said time periods.

9. Apparatus as claimed in claim 6, wherein the at least partly separate receiver is usable to detect access messages on a plurality of channels including a first access channel; comprising:
means for counting a first number of detected access messages on the first access channel;
means for counting the second number of separately detected access messages; and
means for comparing the first and second counted numbers, taking into consideration a proportion of the total monitoring time which the at least partly separate receiver spends monitoring the first access channel.

10. Apparatus as claimed in claim 6, wherein the at least partly separate receiver is usable for performing verifications.

11. A method of monitoring a control channel in a radio communications network comprising:
a base station;
a plurality of mobile stations;
means for detecting access requests sent from mobile stations to the network; and
means for setting up calls in respect of granted access requests;
the method comprising:
counting a first number of granted access requests;
separately detecting access requests sent from said mobile stations by means of a receiver which is at least partly separate from the means for detecting access requests and means for setting up calls;
counting a second number of separately detected access requests; and
comparing the first and second counted numbers.

12. A method as claimed in claim 11, comprising:
detecting a fault if a comparison result does not meet predetermined criteria.

13. A method as claimed in claim 11, comprising:
counting the first number during a plurality of time periods;
counting the second number during the same plurality of time periods; and
detecting a fault if the first and second numbers differ by more than a predetermined amount during more than a predetermined number of said time periods.

14. A method as claimed in claim 11, comprising:
using the at least partly separate receiver to detect access requests on a plurality of channels including a first access channel;
counting a first number of granted access requests on the first access channel;
counting the second number of separately detected access requests; and
comparing the first and second counted numbers, taking into consideration a proportion of the total monitoring time which the at least partly separate receiver spends monitoring the first access channel.

15. A method as claimed in claim 11, wherein the at least partly separate receiver is usable for performing verifications.

16. Apparatus for use in a radio communications network comprising:
a base station;
a plurality of mobile stations;
means for detecting access requests sent from mobile stations to the network; and
means for setting up calls in respect of granted access requests;
the apparatus comprising:
means for counting a first number of granted access requests;
a receiver, which is at least partly separate from the means for detecting access requests and means for setting up calls, for separately detecting access requests sent from said mobile stations;

means for counting a second number of separately detected access requests; and means for comparing the first and second counted numbers.

17. Apparatus as claimed in claim 16, comprising:

means for detecting a fault if a comparison result does not meet predetermined criteria.

18. Apparatus as claimed in claim 16, comprising:

means for counting the first number during a plurality of time periods;

means for counting the second number during the same plurality of time periods; and means for detecting a fault if the first and second numbers differ by more than a predetermined amount during more than a predetermined number of said time periods.

19. Apparatus as claimed in claim 16, wherein the at least partly separate receiver is usable to detect access requests on a plurality of channels including a first access channel; comprising:

means for counting a first number of granted access requests on the first access channel;

means for counting the second number of separately detected access requests; and means for comparing the first and second counted numbers, taking into consideration a proportion of the total monitoring time which the at least partly separate receiver spends monitoring the first access channel.

20. Apparatus as claimed in claim 16, wherein the at least partly separate receiver is usable for performing verifications.

\* \* \* \* \*